United States Patent Office 3,100,347
Patented Aug. 13, 1963

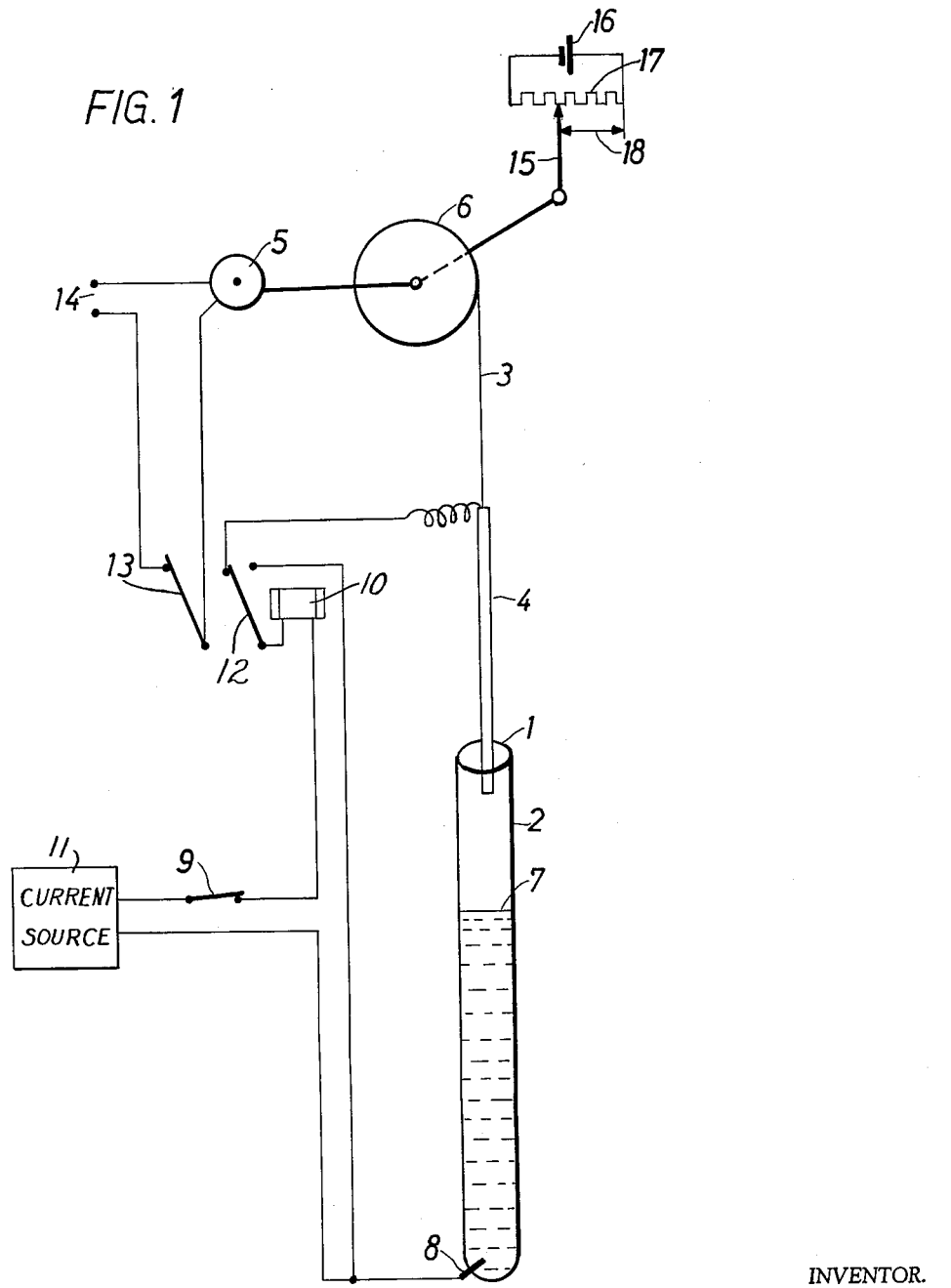

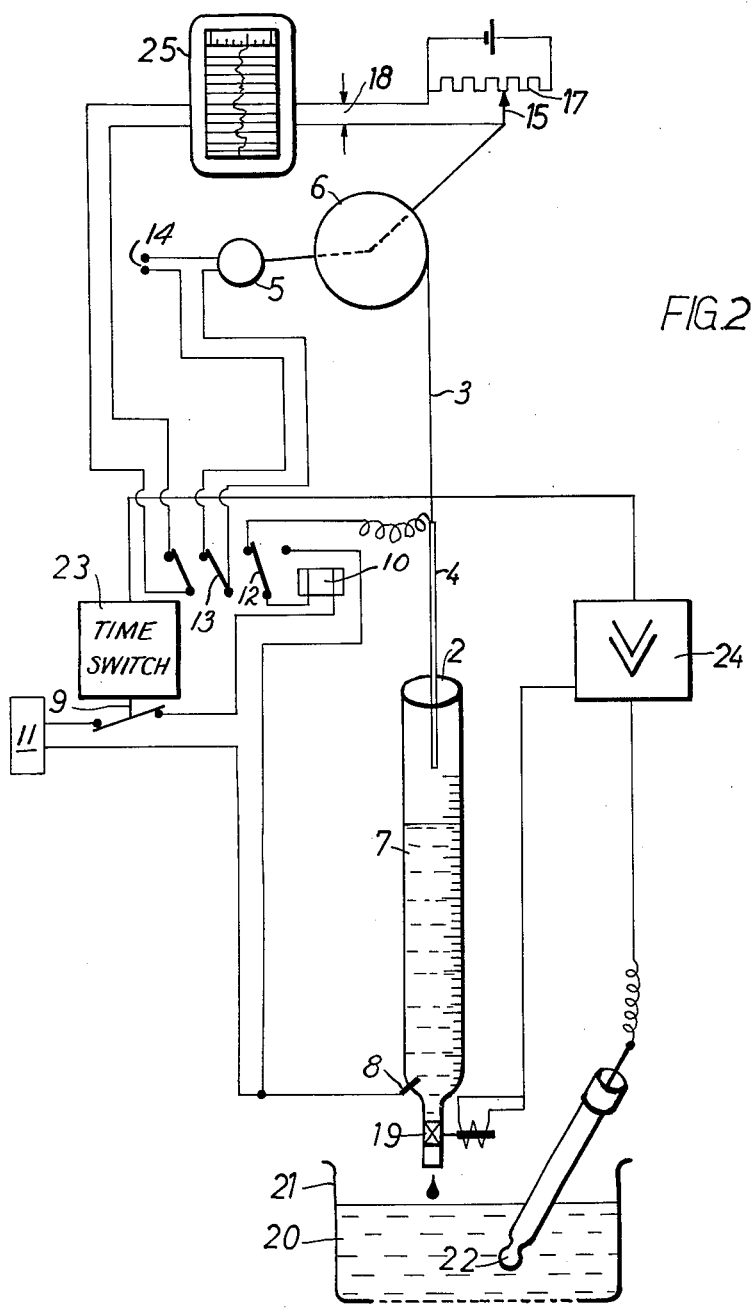

3,100,347
MEANS FOR INDICATING OR RECORDING THE LIQUID LEVEL IN NARROW, LONG MEASURING VESSELS
Ulrich Fritze, Leverkusen, Germany, assignor to Farbenfabriken Bayer Aktiengesellschaft, Leverkusen, Germany, a corporation of Germany
Filed Dec. 23, 1959, Ser. No. 861,593
Claims priority, application Germany Dec. 27, 1958
1 Claim. (Cl. 33—126.6)

This invention relates to an automatic means for measuring the liquid level in long measuring vessels having a width of at least about 5–10 mm., the measurement being repeated at adjustable intervals which can be preselected and with an accuracy of approximately 0.3–0.5 mm. According to the invention, the liquid level is converted into an electrical voltage, it being possible for the voltage to control electrical indicating or recording instruments and regulators. The invention is advantageously used for measuring and recording the level in narrow tubes of limited height, such as in measuring burettes for chemical analysis, for example with automatic titrating devices.

Processes based on hydrostatic pressure, processes using floats or buoyancy members and radioactive processes utilizing the absorption of gamma radiations are known for automatically measuring and recording the liquid level. These processes are not suitable for reliably detecting any desired liquid levels inside a narrow measuring vessel to fractions of millimetres. Float processes are excluded as level gauges for solutions in narrow tubes of the possible wall friction.

It is known to use photoelectric scanners and processes which utilize the change in resistance of a wire stretched axially in the tube as measuring processes for measuring the level in narrow tubes. When using photoelectric scanners, a photo-electric cell and incandescant lamp arrangement slides externally of the measuring tube, the said arrangement emitting an electrical signal when the liquid level is passed and thus the distance covered by the sliding movement until the signal is emitted is evaluated as a standard for the liquid level. Both of the last-mentioned processes presuppose that no liquid drops remain adhering to the internal transparent glass wall or to the resistance wire, and also that not even slight deposits are formed. In addition, as regards the resistance wire, suitable corrosion-resisting material must be available. Furthermore, electrolysis of the liquid can readily occur because of the resistance wire conducting voltage. In the case of photoelectric scanning, the photoelectric circuit must be very stable as regards zero point and the photoelectric cells may only show a very slight change in their characteristics.

According to the invention, the disadvantages of the previously described measuring processes are obviated if the measurement of the level is effected by sounding the liquid level in the apparatus hereinafter described.

The arrangement according to the invention is illustrated by way of example and in diagrammatic form in FIGS. 1 and 2. Suspended above an opening 1 (FIG. 1) of the liquid level measuring vessel 2 on a stretched plastic filament 3 is a metal rod 4. This metal rod 4 can be lowered by unwinding the plastic filament 3 from a supply reel 6 into the level-measuring vessel 2. The supply reel 6 is driven by a servomotor 5. Both the metal rod 4 and an electric conductor 8 fitted in the bottom end of the measuring vessel 2 are connected to a current source 11 by way of a switch 9, which is manually or remotely controlled, a highly sensitive relay 10 and a change-over switch 12 controlled by the relay. When the descending metal rod touches the surface 7 of the liquid, the circuit is closed through the liquid and a current flows. The relay 10 which now becomes operative first of all switches over the switch 12 so that the metal rod 4 and the electric conductor 8 are without voltage and no electrolysis of the liquid takes place. Current continues to flow through the relay 10, since the change-over of the contact 12 effects the necessary change in path of the current. Simultaneously with the changing over of contact 12, the contact 13 disconnects the servo-motor 5 from its current supply 14, so that the supply reel 6 is no longer rotated. Coupled rigidly with the supply reel 6 is the tapping 15 of a potentiometer 17 connected to the voltage source 16. The adjustment of the potentiometer tapping 15 obtained by the unwinding of the plastic filament 3 produces a certain electrical voltage 18 between the potentiometer tapping 15 and the start of the winding of the said potentiometer 17 and this voltage 18 is thus a standard for the liquid level.

The arrangement described permits in simple manner automatic measurement of the liquid level and this measurement can be repeated as often as desired. For this purpose, the switch 9 is actuated by a time switch which short-circuits and opens the switch 9 approximately every 5 minutes. Simultaneously with the opening of the switch 9, the time switch causes the return of the servo-motor 5 to its starting position by means of an additional switch.

One example of the use of the circuit arrangement as described is shown in FIGURE 2. The level measuring vessel 2 in this case is a measuring burette, such as used for chemical titration. The burette is closed at the bottom end by a magnetic valve 19, beneath which is situated the measuring beaker 21 which is filled with the solution 20 to be titrated and which has an electrochemical end point indicator 22 (perhaps a pH measurement chain). The switch 9 is a relay switch, which is controlled by a control device 23. At a given time, the switch 9 is closed and the metal rod 4 hangs down in its initial position without touching the standard solution 7.

The beaker 20 will be filled automatically in known manner at regular intervals with measuring solution and the burette 2 will be regularly filled automatically in known manner with standard solution 7, it being possible to determine these time intervals by the time switch 23. The indicator 22 can then actuate the magnetic valve 19 in known manner through an amplifier 24, so that after filling the burette 2 and the measuring vessel 21, the measuring burette empties to the final titration point. Since the control instrument 23 is connected to the measuring amplifier 24, it is possible to achieve the result that the level in the burette is measured in the manner previously described after reaching the end titration point. It is possible to achieve recording of the liquid level by the voltage in leads 18 tapped off at the potentiometer 17 by transferring the tapping 15 to an ink recorder or gravity-type recorder 25 with electrically operated drum. The necessary impulses to actuate the drum periodically are easily produced by an additional contact 26 to the relay 10 in the electrical circuit of the drum of recorder 25.

It is thus possible in this way to make fully automatic chemical large-scale processes which require titration for the control thereof.

I claim:

A liquid level indicator for measuring vessels comprising an electric conductor element insertable into such measuring vessel above the liquid level, an electric servo-motor to lower said element to contact the upper surface of such liquid, a relay, an electric circuit including a source of current and said element, the liquid and said relay, a time switch in said circuit adapted to interrupt said circuit periodically, said relay having a shunt circuit about said element and liquid to maintain normally energized the servo-motor circuit control of said relay, and means operable by said servo-motor to indicate the position of said conductor element.

References Cited in the file of this patent
UNITED STATES PATENTS

| | | |
|---|---|---|
| 1,611,407 | Berg | Dec. 21, 1926 |
| 2,032,016 | Hitner | Feb. 25, 1936 |
| 2,704,401 | Mohr et al. | Mar. 22, 1955 |